US012645042B2

(12) United States Patent
Liu et al.

(10) Patent No.: US 12,645,042 B2
(45) Date of Patent: Jun. 2, 2026

(54) PLUGGABLE OPTOELECTRONIC TRANSCEIVER

(71) Applicant: Formerica OptoElectronics Inc., Hsinchu County (TW)

(72) Inventors: Peter Sin-Te Liu, Hsinchu County (TW); Joseph Chen-Kwo Liu, Hsinchu County (TW); Hung-Fu Yeh, Hsinchu County (TW); Chih-Chun Chiang, Hsinchu County (TW)

(73) Assignee: Formerica OptoElectronics Inc., Hsinchu County (TW)

( * ) Notice: Subject to any disclaimer, the term of this patent is extended or adjusted under 35 U.S.C. 154(b) by 191 days.

(21) Appl. No.: 18/382,357

(22) Filed: Oct. 20, 2023

(65) Prior Publication Data

US 2024/0134135 A1     Apr. 25, 2024
US 2024/0231021 A9     Jul. 11, 2024

Related U.S. Application Data

(60) Provisional application No. 63/418,386, filed on Oct. 21, 2022.

(30) Foreign Application Priority Data

Sep. 22, 2023     (TW) .................................. 112136304

(51) Int. Cl.
*H04B 10/00*          (2013.01)
*G02B 6/42*           (2006.01)

(52) U.S. Cl.
CPC ......... *G02B 6/4268* (2013.01); *G02B 6/4292* (2013.01)

(58) Field of Classification Search
CPC ............................ G02B 6/4268; G02B 6/4292
See application file for complete search history.

(56) References Cited

U.S. PATENT DOCUMENTS

| | | | | |
|---|---|---|---|---|
| 6,220,764 B1 * | 4/2001 | Kato | ................... | G02B 6/4204 |
| | | | | 264/1.25 |
| 7,457,126 B2 * | 11/2008 | Ahrens | ................. | H01L 23/427 |
| | | | | 257/E23.088 |
| 2006/0291171 A1 * | 12/2006 | Ahrens | ................. | H01L 23/427 |
| | | | | 257/E23.088 |
| 2019/0281691 A1 * | 9/2019 | Matsui | ................. | H05K 1/0203 |
| 2020/0026010 A1 * | 1/2020 | Iwama | ................. | G02B 6/4268 |
| 2020/0379164 A1 * | 12/2020 | Clatanoff | ............ | G02B 6/3814 |
| 2021/0007243 A1 * | 1/2021 | Lin | ..................... | G02B 6/4268 |
| 2021/0112683 A1 * | 4/2021 | Mohajer | ............. | G02B 6/4261 |
| 2022/0003946 A1 * | 1/2022 | Edwards, Jr. | ........ | G02B 6/4269 |
| 2023/0039781 A1 * | 2/2023 | Mohajer | ........... | H05K 7/20254 |

(Continued)

*Primary Examiner* — Agustin Bello
(74) *Attorney, Agent, or Firm* — LANWAY IPR SERVICES; Chun-Ming Shih

(57)          ABSTRACT

This is a type of pluggable optoelectronic transceiver that operates while immersed in cooling fluid for data transmission. The pluggable optoelectronic transceiver consists of an optical module, fluid separating colloid, and colloid separating cover. The fluid separating colloid serves to keep the cooling fluid separate from the optical module, while the colloid separating cover further ensures separation between the fluid separating colloid and the optical module. This design prevents the cooling fluid and the fluid separating colloid from infiltrating the optical module and affecting its operation.

10 Claims, 5 Drawing Sheets

(56)                    References Cited

U.S. PATENT DOCUMENTS

2023/0194809 A1 *   6/2023   Pratap .................. G02B 6/4251
                                                                  385/88
2023/0389232 A1 *  11/2023   Ahamed .............. G02B 6/4269

* cited by examiner

PLUGGABLE OPTOELECTRONIC TRANSCEIVER

CROSS-REFERENCE TO RELATED APPLICATIONS

This application claims the priority of U.S. patent application No. 63/418,386 filed on Oct. 21, 2022 and the priority of Republic of China Patent Application No. 112136304 filed on Sep. 22, 2023, in the State Intellectual Property Office of the R.O.C., the disclosure of which is incorporated herein by reference.

BACKGROUND OF THE INVENTION

Field of the Invention

This invention relates to a pluggable optoelectronic transceiver, more specifically, a pluggable optoelectronic transceiver that can operate immersed in a cooling liquid to transmit data and prevent the cooling liquid from seeping in.

Descriptions of the Related Art

With the rapid development of network technology, optical fiber communication technology is gradually replacing electrical communication technology for signal transmission in the prior art due to its many advantages, such as fast transmission speed, long transmission distance, resistance to electromagnetic interference, and high security. Therefore, the optical fiber communication industry has now become the communication technology of the main development in modern times, and widely used in information communication between various industries or equipment. As a result, the bandwidth and speed requirements of optical fiber communication are gradually increasing.

For example, pluggable optoelectronic transceivers, such as SFP series (Small Form-Factor Pluggable), QSFP series (Quad Small Form-Factor Pluggable), QSFP-DD series (Quad Small Form-Factor Pluggable Double Density), and OSFP series (Octal Small Form-factor Pluggable), are often used in fiber network equipment in the optical fiber communication industry to achieve high-capacity and high-speed data transmission.

Regarding pluggable optoelectronic transceivers, a built-in optoelectronic transceiver module and optical module are usually included. The operation of the optoelectronic transceiver module can convert data into a light beam with the data, the optical module provides the propagating guide for the light beam and includes a light beam propagation space. It should be noted that the light beam propagation space provides the light beam with the data to propagation therein to achieve the data transmission.

Pluggable optoelectronic transceivers need to work continuously for a long time since fiber network equipment generally operates around the clock. As a result, the pluggable optoelectronic transceiver requires heat dissipation due to the operating temperature being easy to rise. Regarding the heat dissipation of pluggable optoelectronic transceivers, which generally can be immersed in a cooling fluid with high thermal conductivity. The heat generated by the operation of the pluggable optoelectronic transceiver is quickly dissipated through the cooling fluid, thereby maintaining the proper operating temperature for pluggable optoelectronic transceivers to improve the performance and lifespan of the pluggable optoelectronic transceivers.

However, there are also some problems with immersing pluggable optoelectronic transceivers in cooling fluids. For example, the cooling fluid may easily penetrate into the pluggable optoelectronic transceiver, affecting the operation of the optoelectronic transceiver module. It may even affect the propagation of the light beam in the light beam propagation space, causing the pluggable optoelectronic transceiver to fail to work properly.

In view of this, how to improve current pluggable optoelectronic transceivers to prevent cooling fluid from penetrating into the pluggable optoelectronic transceivers is an urgent problem that needs to be solved for people in the art.

SUMMARY OF THE INVENTION

Given the various issues with the prior art as described above, a primary objective of the present invention is to provide a pluggable optoelectronic transceiver that can facilitate heat dissipation through a cooling fluid and, at the same time, prevent the ingress of the cooling fluid into the pluggable optoelectronic transceiver.

To achieve the aforementioned objectives and other purposes, the present invention provides a pluggable optoelectronic transceiver that can be operated while immersed in a cooling fluid to transmit data. The pluggable optoelectronic transceiver comprises an optoelectronic transceiver body with a body accommodation space which contains a fluid separating colloid accommodation subspace and an optical module accommodation subspace, wherein the fluid separating colloid accommodation subspace surrounds the optical module accommodation subspace; an optoelectronic transceiver module that converts data into a light beam carrying the data; an optical module accommodated within the optical module accommodation subspace, and the optical module is capable of receiving the light beam, wherein the optical module includes a light beam propagation space that provides the light beam to propagate through the light beam propagation space to enable the transmission of the data; a fluid separating colloid filled into the fluid separating colloid accommodation subspace to cover the optical module accommodation subspace, thereby separating the cooling fluid from the optical module accommodation subspace to prevent the cooling fluid from infiltrating the optical module and affecting the propagation of the light beam in the light beam propagation space; a colloid separating cover accommodated within the body accommodation space to separate the fluid separating colloid accommodation subspace from the optical module accommodation subspace to prevent the fluid separating colloid from infiltrating the optical module and affecting the propagation of light beam in the light beam propagation space.

Preferably, in the pluggable optoelectronic transceiver mentioned above, the optical module also includes an optical input component and an optical output component, wherein the optical input component is designed to receive the light beam and guide the light beam into the light beam propagation space for transmission. Subsequently, the optical output component can receive the light beam within the light beam propagation space and allow the light beam to output, facilitating the transmission of the data.

Preferably, in the pluggable optoelectronic transceiver mentioned above, the optical input component and the optical output component can make the light beam become a parallel light beam or focus the light beam on a collimator.

Preferably, in the pluggable optoelectronic transceiver mentioned above, the light beam propagation space includes a light beam input path and a light beam output path.

Furthermore, the optical module includes a light beam direction alteration component positioned between the light beam input path and the light beam output path, wherein the optical input component guides the light beam into the light beam input path, directing it toward the light beam direction alteration component. Subsequently, the light beam direction alteration component receives the light beam in the light beam input path, making the light beam change the direction and enter the light beam output path to propagate towards the optical output component. Finally, the optical output component receives the light beam within the light beam output path.

Preferably, in the pluggable optoelectronic transceiver mentioned above, the fluid separating colloid separates the cooling fluid from the light beam input path and the light beam output path, preventing the cooling fluid from infiltrating either the light beam input path or the light beam output path. This, in turn, prevents the cooling fluid from interfering with the propagation of the light beam within the light beam input path or the light beam output path.

Preferably, in the pluggable optoelectronic transceiver mentioned above, the colloid separating cover separates the fluid separating colloid from both the light beam input path and the light beam output path, thus preventing the fluid separating colloid from infiltrating either the light beam input path or the light beam output path. This, in turn, prevents the fluid separating colloid from affecting the propagation of the light beam within the light beam input path or the light beam output path.

Preferably, in the pluggable optoelectronic transceiver mentioned above, the body accommodation space also contains an optoelectronic transceiver module accommodation subspace, wherein the optoelectronic transceiver module is accommodated in the optoelectronic transceiver module accommodation subspace. The fluid separating colloid accommodation subspace surrounds the optoelectronic transceiver module accommodation subspace to can cause the fluid separating colloid filled within the fluid separating colloid accommodation subspace to separate the cooling fluid from the optoelectronic transceiver module accommodation subspace, thus preventing the cooling fluid from infiltrating the optoelectronic transceiver module accommodation subspace and affecting the operation of the optoelectronic transceiver module.

Preferably, in the pluggable optoelectronic transceiver mentioned above, it further includes a light beam direction alteration component actuator. The light beam direction alteration component actuator is connected to the light beam direction alteration component. The light beam direction alteration component actuator can actuate the light beam direction alteration component to allow the light beam direction alteration component to be positioned between the light beam input path and the light beam output path. The body accommodation space also contains an actuator accommodation subspace, wherein the light beam direction alteration component actuator is accommodated in the actuator accommodation subspace. The fluid separating colloid accommodation subspace surrounds the actuator accommodation subspace to allow the fluid separating colloid filled in the fluid separating colloid accommodation subspace to separate the cooling fluid from the actuator accommodation subspace, preventing the cooling fluid from infiltrating the actuator accommodation subspace and affecting the operation of the light beam direction alteration component actuator.

Preferably, in the pluggable optoelectronic transceiver mentioned above, it further includes a circuit module that is connected to and can control the optoelectronic transceiver module and the light beam direction alteration component actuator, and the body accommodation space further includes a circuit module accommodation subspace, wherein the circuit module is accommodated in the circuit module accommodation subspace surrounded by the fluid separating colloid accommodation subspace in which the fluid separating colloid filled can separate the cooling fluid from the circuit module accommodation subspace, and can further prevent the cooling fluid from penetrating into the circuit module accommodation subspace and affecting the operation of the circuit module.

Preferably, in the pluggable optoelectronic transceiver mentioned above, the optical module further includes an optical component base containing an optical component positioning structure and a colloid separating cover positioning structure, wherein the optical component positioning structure positions the optical input component and the optical output component in the optical module accommodation subspace so that the optical input component can receive the light beam, and allow the light beam to enter the light beam propagation space and the optical output component can receive the light beam in the light beam propagation space; the colloid separating cover positioning structure positions the colloid separating cover in the body accommodation space so that the colloid separating cover can separate the fluid separating colloid accommodation subspace from the optical module accommodation subspace.

In summary, the pluggable optoelectronic transceiver in the present invention operates immersed in a cooling fluid, effectively reducing temperatures to enhance its efficiency and lifespan. This design prevents damage to the pluggable optoelectronic transceiver due to high temperature, ensuring stable and reliable data transmission. Moreover, the use of a fluid separating colloid prevents cooling fluid from infiltrating, and a colloid separating cover prevents the colloid from infiltrating, avoiding the negative impact of cooling fluid and fluid separating colloid infiltrating the pluggable optoelectronic transceiver, thus safeguarding the operation of the pluggable optoelectronic transceiver.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
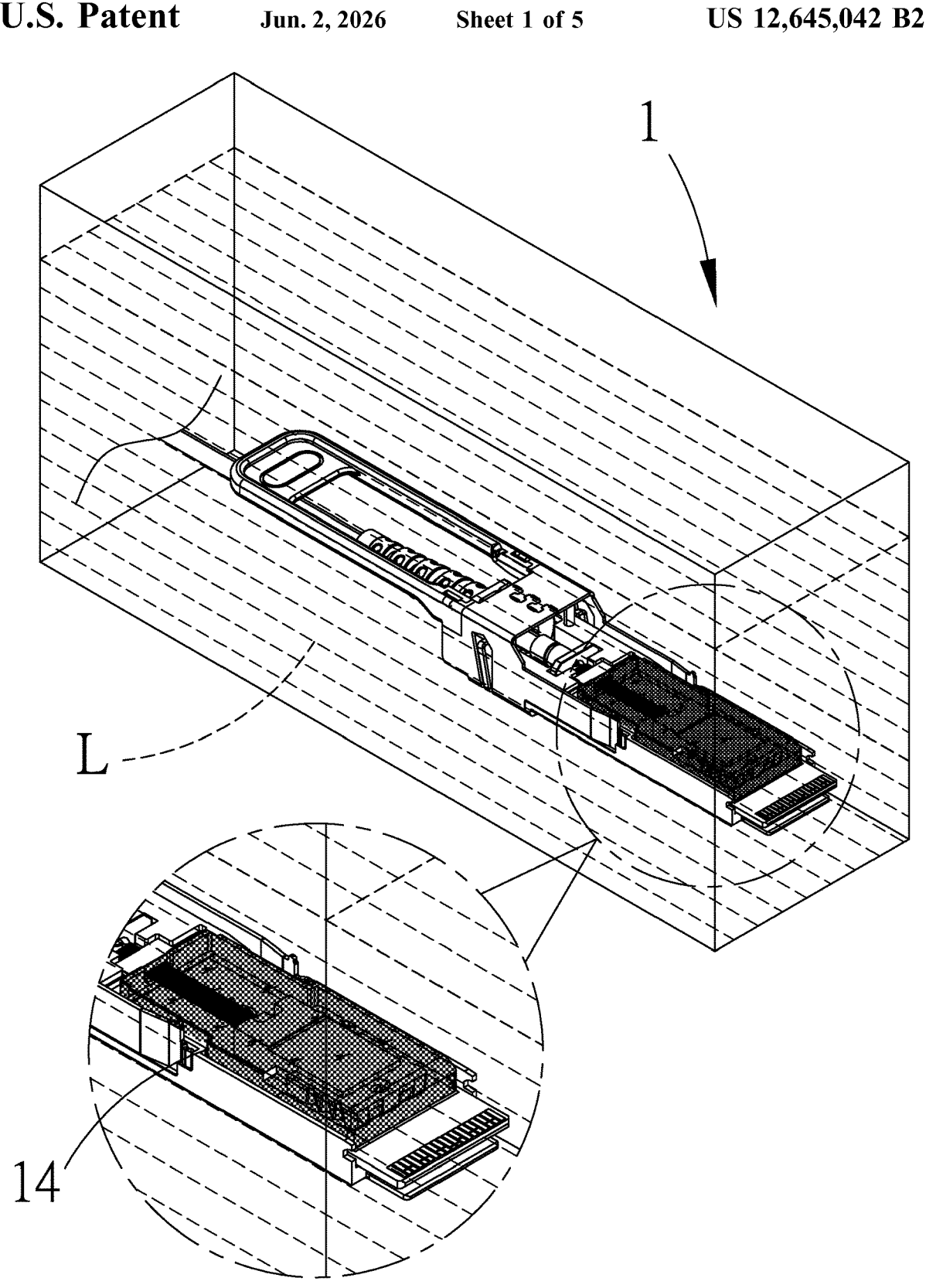
FIG. 1 is a schematic diagram of the state of the pluggable optoelectronic transceiver in the present invention immersed in a cooling fluid.
Figure 2:
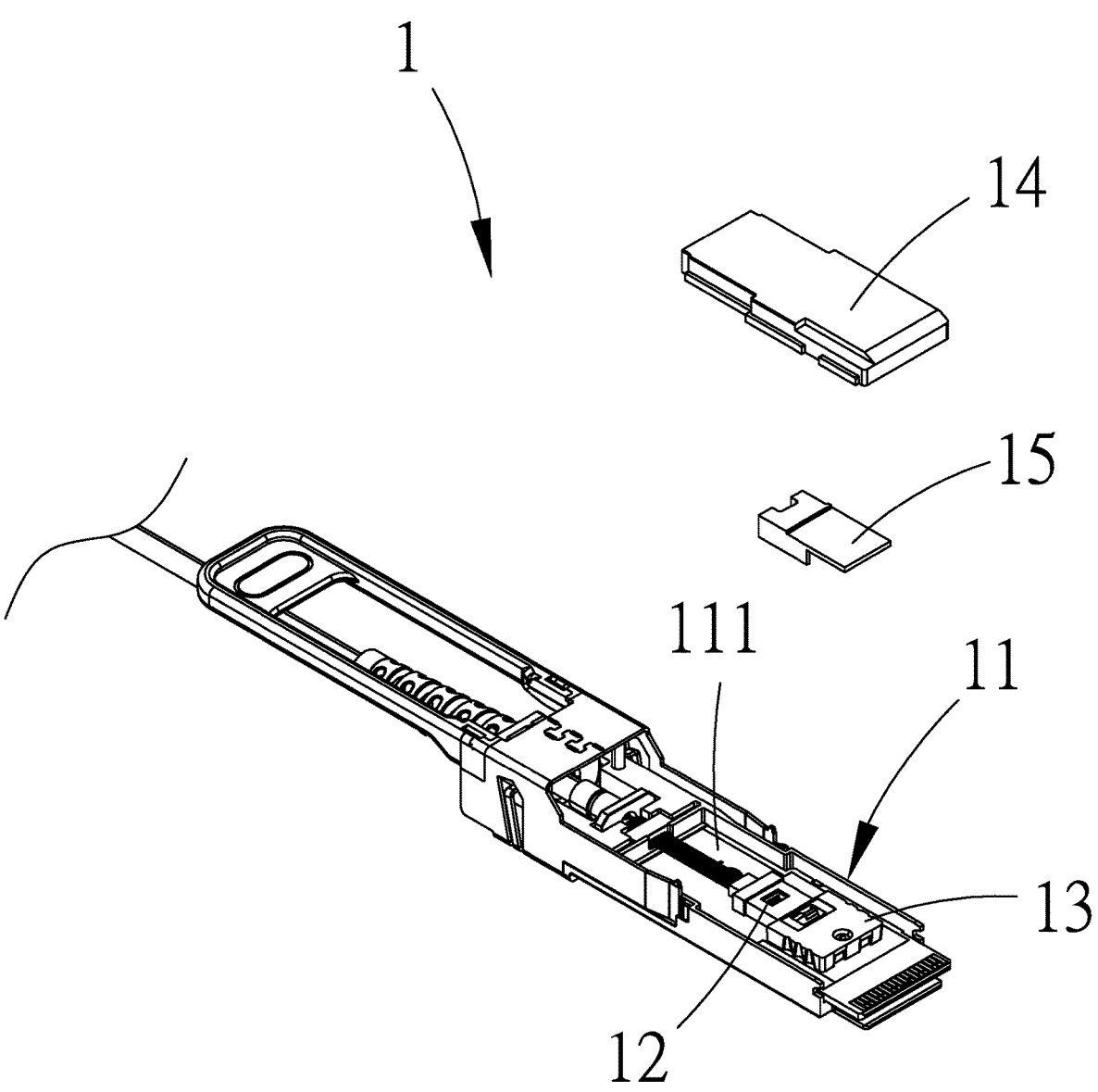
FIG. 2 is an exploded view diagram of some components of the pluggable optoelectronic transceiver in the present application.
Figure 3:
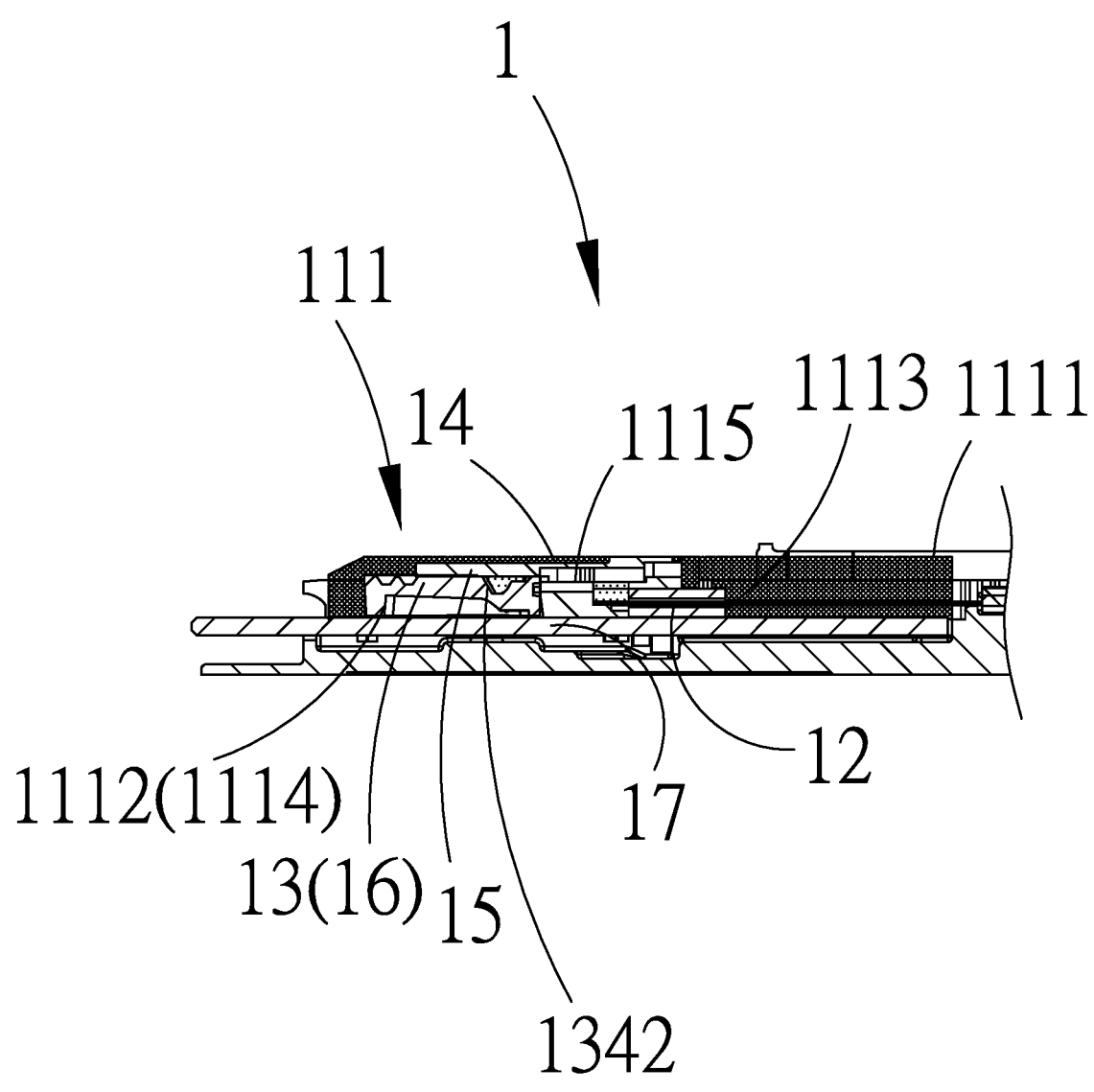
FIG. 3 is a cross-section diagram of the pluggable optoelectronic transceiver in the present application.

First, please refer to FIG. 1, FIG. 2, and FIG. 3, which respectively depict a schematic diagram of the state of the pluggable optoelectronic transceiver immersed in a cooling fluid in the present invention, a partial exploded view of components in the pluggable optoelectronic transceiver of the present invention, and a cross-section diagram of the pluggable optoelectronic transceiver of the present invention.

First, as shown in FIG. 1, the pluggable optoelectronic transceiver 1 of the present invention can be immersed in a cooling fluid L to transmit data. It does so by allowing the cooling fluid L to absorb the heat generated during the operation of the pluggable optoelectronic transceiver 1 to enable the pluggable optoelectronic transceiver 1 to rapidly dissipate heat and ensure its normal stability and reliability. Therefore, the pluggable optoelectronic transceiver 1 can be used as an active optical fiber transmission cable suitable for immersion cooling environments.

In the present invention, the pluggable optoelectronic transceiver 1 primarily consists of the following components: an optoelectronic transceiver body 11, an optoelectronic transceiver module 12, an optical module 13, a fluid separating colloid 14, and a colloid separating cover 15.

The optoelectronic transceiver body 11 has a body accommodation space 111, which includes a fluid separating colloid accommodation subspace 1111 and an optical module accommodation subspace 1112. Notably, the fluid separating colloid accommodation subspace 1111 surrounds the optical module accommodation subspace 1112.

Figure 4:
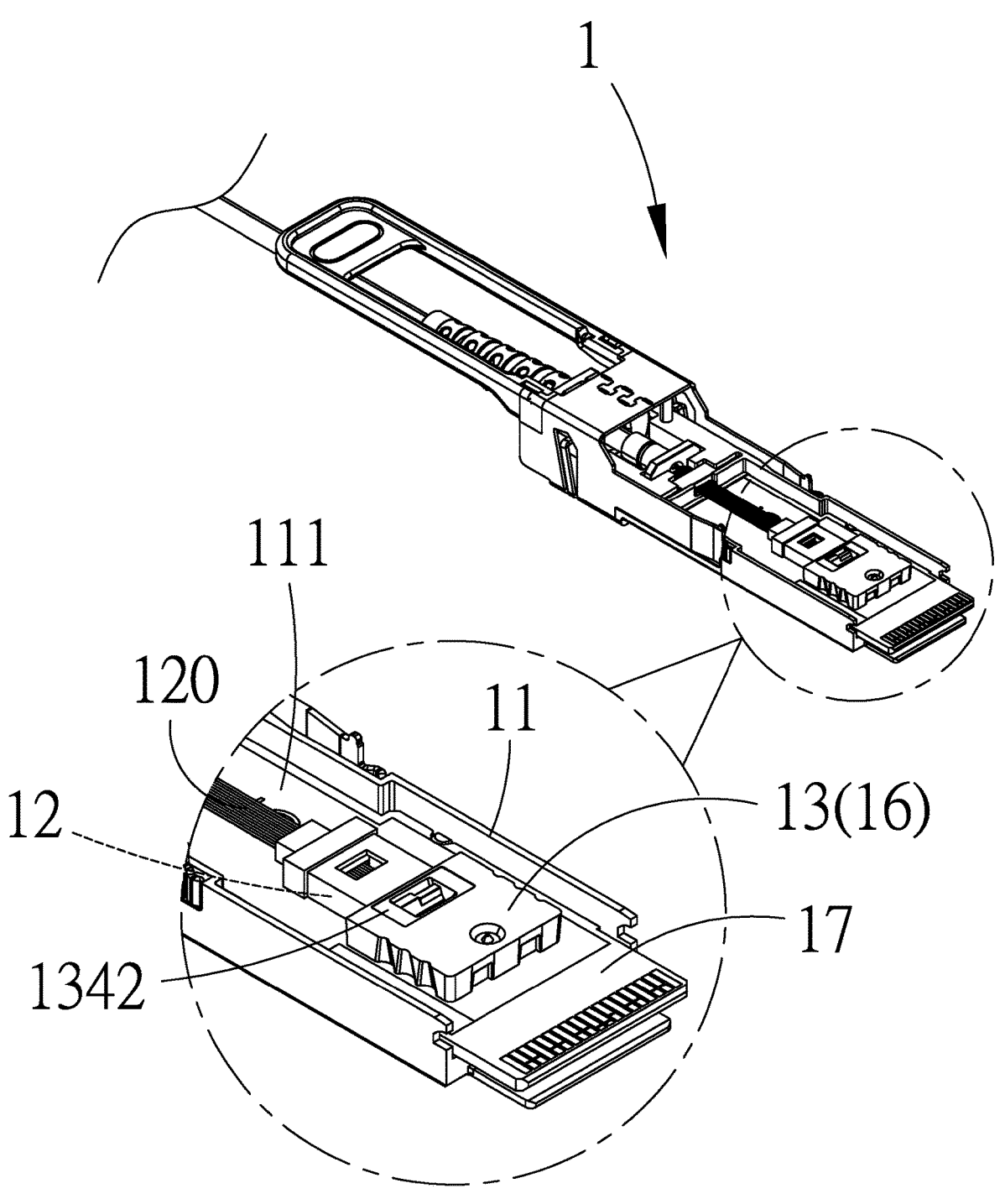
FIG. 4 is an enlarged partial view of the pluggable optoelectronic transceiver shown in FIG. 2, without the covering of the fluid separating colloid and the colloid separating cover.

The optoelectronic transceiver module 12 is accommodated within the body accommodation space 111 of the pluggable optoelectronic transceiver 1. Its purpose is to convert data into a light beam B within the pluggable optoelectronic transceiver 1, wherein the light beam B carries the data. Correspondingly, the optical module 13 receives the light beam B carrying the data and enables the light beam B to propagate within, thereby achieving transmission of the data. Furthermore, in the pluggable optoelectronic transceiver 1 of the present invention, as shown in FIG. 4, the optoelectronic transceiver module 12 can also be connected to an optical fiber 120 to facilitate the emission and reception of the light beam B, thereby enabling transmission of the data.

Figure 5:
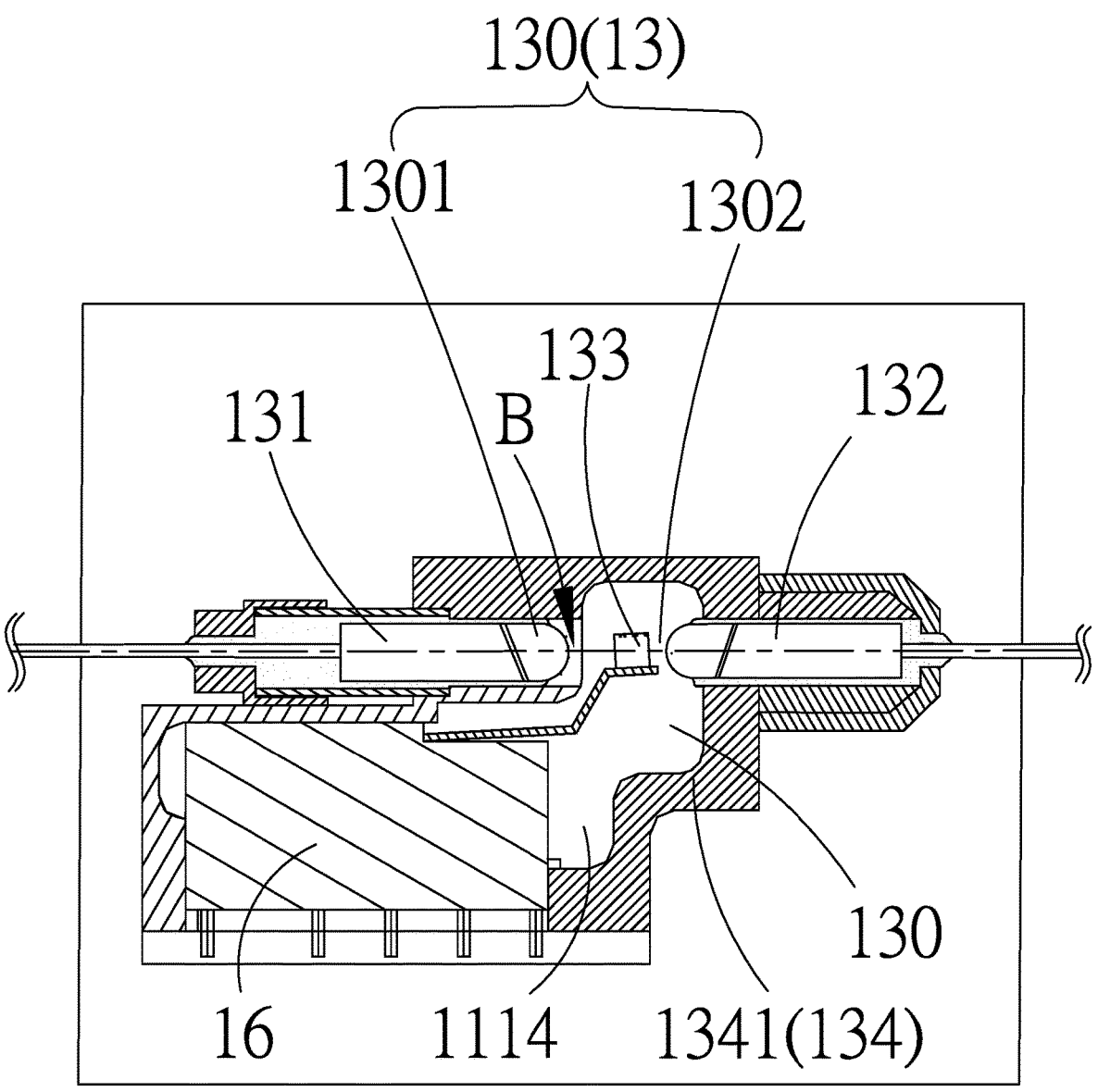
FIG. 5 is a cross-section diagram of the optical module of the pluggable optoelectronic transceiver in the present application.

To better understand the structure of the optical module 13 in the pluggable optoelectronic transceiver 1 of the present invention, please refer to FIG. 5, which provides a cross-section diagram of the optical module within the pluggable optoelectronic transceiver. The optical module 13 is accommodated within the optical module accommodation subspace 1112. The optical module 13 receives the light beam B and guides the light beam B to propagate. The optical module 13 contains a light beam propagation space 130 allowing the light beam B to propagate within and facilitates data transmission. Additionally, the optical module 13 is equipped with an optical input component 131 and an optical output component 132. The optical input component 131 and the optical output component 132 can either render the light beam B as a parallel beam or focus the light beam B onto a collimator. However, the selection of these components is not limited to these options. It depends on the design and specific application context of the pluggable optoelectronic transceiver 1. A variety of optical components that can achieve beam focusing and control may be used as the optical input component 131 and optical output component 132 such as micro lenses, polarizers, and more.

The optical module 13 also includes an optical component base 134, which has an optical component positioning structure 1341 and a colloid separating cover positioning structure 1342. The optical component positioning structure 1341 is used to position the optical input component 131 and optical output component 132 within the optical module accommodation subspace 1112 to allow the optical input component 131 to receive the light beam B and direct the light beam B into the light beam propagation space 130, while enabling the optical output component 132 to receive the light beam B within the light beam propagation space 130. The colloid separating cover positioning structure 1342 is used to position the colloid separating cover 15 within the main body accommodation space 111, ensuring that the colloid separating cover 15 can separate the fluid separating colloid accommodation subspace 1111 from the optical module accommodation subspace 1112.

Furthermore, the main body accommodation space 111 also includes an optoelectronic transceiver module accommodation subspace 1113, which is designed for accommodating the optoelectronic transceiver module 12. The fluid separating colloid accommodation subspace 1111 surrounds the optoelectronic transceiver module accommodation subspace 1113. To prevent the cooling fluid L from infiltrating the main body accommodation space 111 and potentially affecting the operation of the optoelectronic transceiver module 12, the fluid separating colloid 14 is filled into the fluid separating colloid accommodation subspace 1111. By using the fluid separating colloid 14, the cooling fluid L is kept separate from the optoelectronic transceiver module accommodation subspace 1113 to prevent the cooling fluid L from infiltrating the optoelectronic transceiver module accommodation subspace 1113 and affecting the operation of the optoelectronic transceiver module 12.

The optical input component 131 is used to receive the light beam B and allows the light beam B to enter the light beam propagation space 130 for transmission. Subsequently, the optical output component 132 is capable of receiving the light beam B within the light beam propagation space 130 and enabling the output of the light beam B to achieve data transmission. To prevent the cooling fluid L from infiltrating the optical module 13 and affecting the propagation of the light beam B within the light beam propagation space 130, the fluid separating colloid 14 is filled in the fluid separating colloid accommodation subspace 1111, allowing the fluid separating colloid 14 to cover the optical module accommodation subspace 1112, thereby separating the cooling fluid L from the optical module accommodation subspace 1112.

It is noted that the light beam propagation space 130 of the optical module 13 consists of a light beam input path 1301 and a light beam output path 1302. Additionally, the optical module 13 includes a light beam direction alteration component 133, which can optionally be a prism or a rhomboid mirror. The light beam direction alteration component 133 is positioned between the light beam input path 1301 and the light beam output path 1302, wherein the optical input component 131 allows the light beam B to enter the light beam input path 1301, directing the light beam B toward the light beam direction alteration component 133. The light beam direction alteration component 133 can receive the light beam B in the light beam input path 1301, redirecting the light beam B into the light beam output path 1302, aimed towards the optical output component 132. Finally, the optical output component 132 can receive the light beam B in the light beam output path 1302. In the same way as mentioned earlier, to prevent the cooling liquid L from seeping into the light beam input path 1301 or the light beam output path 1302, the fluid separating colloid 14 is employed to keep the cooling fluid L from infiltrating either the light beam input path 1301 or the light beam output path 1302, thus preventing the cooling fluid L from interfering with the propagation of the light beam B in the light beam input path 1301 or the light beam output path 1302.

The pluggable optoelectronic transceiver 1 of the present invention also includes a light beam direction alteration component actuator (Liquid Crystal on Silicon; LCoS) 16. The light beam direction alteration component actuator 16 is connected to the light beam direction alteration component 133. The light beam direction alteration component actuator 16 is capable of actuating the light beam direction alteration component 133, positioning the light beam direction alteration component 133 between the light beam input path 1301 and the light beam output path 1302. The light beam direction alteration component actuator 16 is used to control the alignment and polarization of the light beam B, thereby achieving improved optical performance and signal transmission quality. Similarly, the body accommodation space 111 includes an actuator accommodation subspace 1114. The light beam direction alteration component actuator 16 is accommodated within the actuator accommodation subspace 1114, and the fluid separating colloid accommodation subspace 1111 surrounds the actuator accommodation subspace 1114. By filling the fluid separating colloid 14 into the fluid separating colloid accommodation subspace 1111 to separate the cooling liquid L from the actuator accommodation subspace 1114, thus preventing the cooling liquid L from infiltrating the actuator accommodation subspace 1114 and affecting the operation of the light beam direction alteration component actuator 16.

Additionally, the colloid separating cover 15 is accommodated within the body accommodation space 111 to separate the fluid separating colloid accommodation subspace 1111 from the optical module accommodation subspace 1112 to prevent the fluid separating colloid 14 from infiltrating the optical module 13 and affecting the propagation of the light beam B in the light beam propagation space 130. Furthermore, the colloid separating cover 15 can also separate the fluid separating colloid 14 from both the light beam input path 1301 and the light beam output path 1302, preventing the fluid separating colloid 14 from seeping into the light beam input path 1301 or the light beam output path 1302 and thus ensuring the fluid separating colloid 14 does not interfere with the propagation of the light beam B.

Furthermore, the pluggable optoelectronic transceiver 1 of the present invention can also include a circuit module 17. The circuit module 17 is electrically connected to both the optoelectronic transceiver module 12 and the light beam direction alteration component actuator 16 to control the operation of the optoelectronic transceiver module 12 and the light beam direction alteration component actuator 16. The body accommodation space 111 additionally comprises a circuit module accommodation subspace 1115, where the circuit module 17 is accommodated. The fluid separating colloid accommodation subspace 1111 surrounds the circuit module accommodation subspace 1115, ensuring that the fluid separating colloid 14 filled in the fluid separating colloid accommodation subspace 1111 keeps the cooling fluid L separated from the circuit module accommodation subspace 1115 to prevent the cooling fluid L from infiltrating the circuit module accommodation subspace 1115 and interfering with the operation of the circuit module 17.

In summary, the pluggable optoelectronic transceiver of the present invention operates immersed in cooling fluid to transmit data. This effectively reduces temperature during high-speed, long-distance data transmission, thus enhancing its operational efficiency and lifespan. It prevents damage due to high temperature, ensuring stability and reliability in data transmission. The pluggable optoelectronic transceiver comprises an optical module, fluid separating colloid, and colloid separating cover. By using the cooling fluid for temperature control and the fluid separating colloid to keep it separate from the optical module, and with the colloid separating cover further providing separation between the fluid and the optical module, this design prevents the cooling fluid and colloid from infiltrating the optical module. In this way, it safeguards the functionality of the pluggable optoelectronic transceiver against the intrusion of cooling fluid and colloid into the optical module.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A pluggable optoelectronic transceiver, capable of being soaked in a cooling fluid to transmit data, comprising:
   an optoelectronic transceiver body including an accommodation space,
   an optoelectronic transceiver module disposed in the accommodation space, operable to convert the data into a light beam with the data,
   an optical module disposed in the accommodation space and connected with the optoelectronic transceiver module, being able to receive the light beam and including a light beam propagation space, wherein the light beam propagates within the light beam propagation space to achieve transmission of the data,
   a colloid separating cover disposed on the optoelectronic transceiver module and the optical module, and
   a fluid separating colloid filling the accommodation space for covering the optical module, the optoelectronic transceiver module and the colloid separating cover to separate the cooling fluid from the optical module, and to further prevent the cooling fluid from penetrating into the optical module and affecting the propagation of the light beam in the light beam propagation space,
   wherein the colloid separating cover prevents the fluid separating colloid from penetrating into the optical module and affecting the propagation of the light beam in the light beam propagation space.

2. The pluggable optoelectronic transceiver of claim 1, wherein the optical module further includes an optical input component and an optical output component, wherein the optical input component is used to receive the light beam and can make the light beam enter the light beam propagation space to propagate, then the optical output component can receive the light beam in the light beam propagation space and can make the light beam output to complete transmission of the data.

3. The pluggable optoelectronic transceiver of claim 2, wherein the optical input component and the optical output component can make the light beam become a parallel light beam or focus the light beam on a collimator.

4. The pluggable optoelectronic transceiver of claim 2, wherein the light beam propagation space includes a light beam input path and a light beam output path, and the optical module further includes an light beam direction alteration component which is located between the light beam input path and the light beam output path, wherein the optical input component can make the light beam enter the light beam input path and propagate towards the light beam direction alteration component, then the light beam direction alteration component can receive the light beam in the light beam input path and turn the light beam into the light beam output path to propagate towards the optical output component, and then the optical output component can receive the light beam in the light beam output path.

5. The pluggable optoelectronic transceiver of claim 4, wherein the light beam input path and the light beam output path are separated by the fluid separating colloid to prevent the cooling fluid from penetrating into the light beam input path or the light beam output path, and to further prevent the propagation of the light beam in the light beam input path or the light beam output path from being affected by the cooling fluid.

6. The pluggable optoelectronic transceiver of claim 4, wherein the fluid separating colloid is separated from the light beam input path and light beam output path by the colloid separating cover to prevent the fluid separating colloid from penetrating into the light beam input path or the light beam output path, and to further prevent the propagation of the light beam in the light beam input path or the light beam output path from being affected by the fluid separating colloid.

7. The pluggable optoelectronic transceiver of claim 4, wherein can further prevent the cooling fluid from penetrating into the optoelectronic transceiver module and affecting the operation of the optoelectronic transceiver module.

8. The pluggable optoelectronic transceiver of claim 7, further comprises a light beam direction alteration component actuator that is connected to and can actuate the light beam direction alteration component to make the light beam direction alteration component be located between the light beam input path and the light beam output path, wherein the fluid separating colloid can further prevent the cooling fluid from penetrating into the light beam direction alteration component actuator accommodation subspace and affecting the operation of the light beam direction alteration component actuator.

9. The pluggable optoelectronic transceiver of claim 8, further comprises a circuit module that is connected to and can control the optoelectronic transceiver module and the light beam direction alteration component actuator, wherein the fluid separating colloid can further prevent the cooling fluid from penetrating into the circuit module and affecting the operation of the circuit module.

10. The pluggable optoelectronic transceiver of claim 2, wherein the optical module further includes an optical component base containing an optical component positioning structure and a colloid separating cover positioning structure, wherein the optical component positioning structure positions the optical input component and the optical output component so that the optical input component can receive the light beam, and allow the light beam to enter the light beam propagation space and the optical output component can receive the light beam in the light beam propagation space; the colloid separating cover positioning structure positions the colloid separating cover in the accommodation space so that the colloid separating cover can separate the fluid separating colloid from the optical module.

* * * * *